United States Patent [19]
Lusk

[11] Patent Number: 4,966,407
[45] Date of Patent: Oct. 30, 1990

[54] REMOVABLE WIND DEFLECTOR FOR FREIGHT CONTAINER, AND ASSEMBLY

[76] Inventor: Russell F. Lusk, 1025 N. Parton, Santa Ana, Calif. 92701

[21] Appl. No.: 341,942

[22] Filed: Apr. 24, 1989

[51] Int. Cl.⁵ .............................................. B62D 35/00
[52] U.S. Cl. .............................. 296/180.1; 296/180.4
[58] Field of Search ................ 296/180.1, 180.2, 180.4

[56] References Cited

U.S. PATENT DOCUMENTS

| | | | |
|---|---|---|---|
| 4,021,069 | 3/1977 | Hersh | 296/180.4 |
| 4,427,229 | 1/1984 | Johnson | 296/180.4 |
| 4,553,781 | 11/1985 | Johnson | 296/180.4 X |

FOREIGN PATENT DOCUMENTS

| | | | |
|---|---|---|---|
| 2459172 | 2/1981 | France | 296/180.2 |
| 2581943 | 11/1986 | France | 296/180.1 |
| 1539452 | 1/1979 | United Kingdom | 296/180.4 |

Primary Examiner—Dennis H. Pedder
Attorney, Agent, or Firm—Willie Krawitz

[57] ABSTRACT

A removable wind deflector is provided for a freight container which may be shipped on an open or flat bed truck, railway car, etc. This reduces the need for an expensive air flow cowling on the truck, and reduces the load on the gear and brake systems, besides improving fuel consumption. The assembly of the deflector and the freight container also permits the user to reduce capital costs inherent in a permanent trailer and box combination. The wind deflector may be attached and removed quickly, without extensive labor, and without changing the shape of the container.

8 Claims, 2 Drawing Sheets

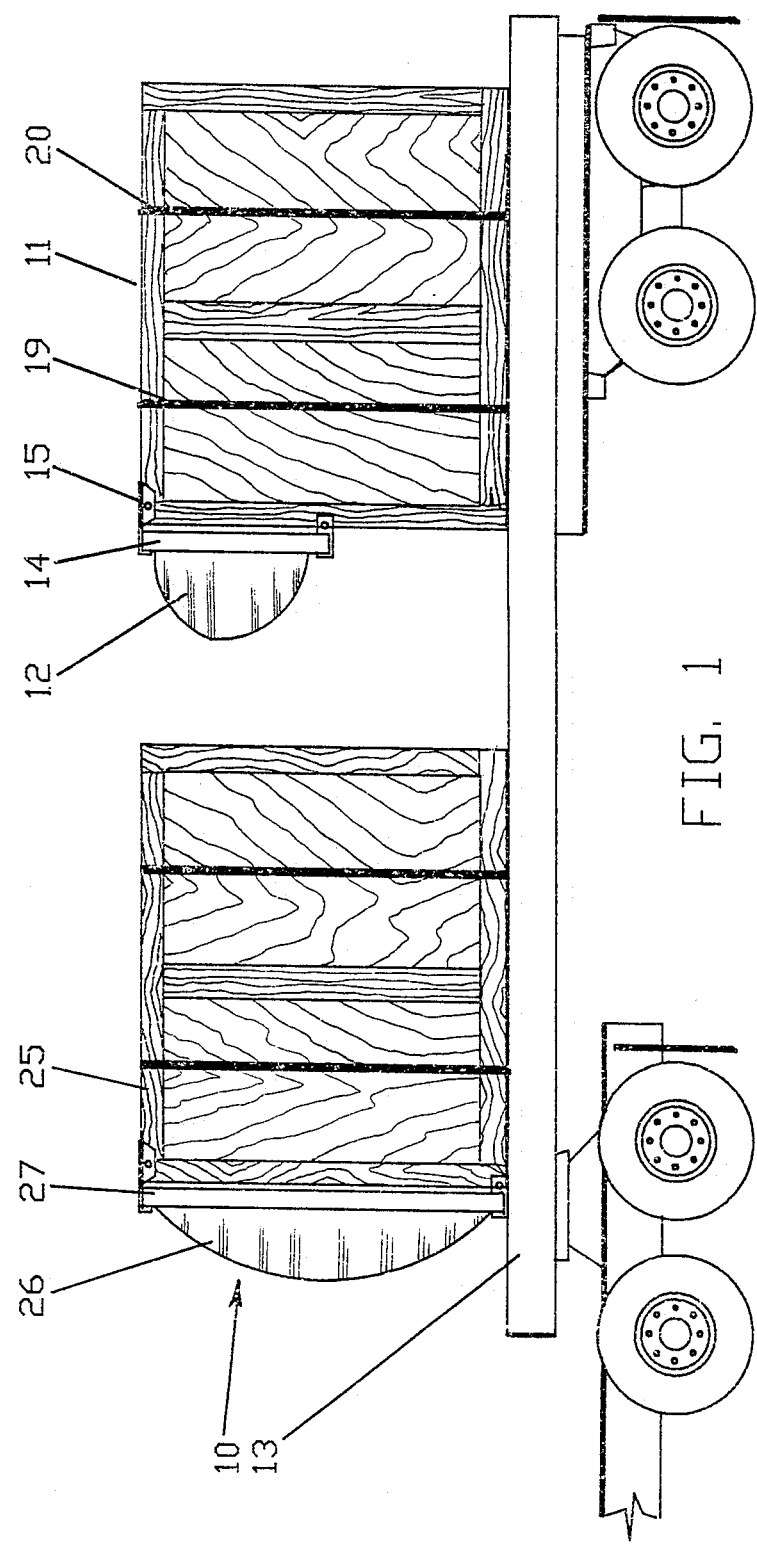

REMOVABLE WIND DEFLECTOR FOR FREIGHT CONTAINER, AND ASSEMBLY

BACKGROUND OF THE INVENTION

This invention relates to a new and improved container transportation system, and method, and to portable containers which can be converted to aerodynamic structures at low cost, and then be quickly and inexpensively reconverted to their original configuration.

The use of aerodynamic leading edges on vehicles to reduce drag is well known, and typical patents in this field include: U.S. Pat. Nos. 4,021,069; 4,098,534; 4,125,754; 4,281,869; 4,318,566; 4,457,550; 4,557,517; 4,560,193; 4,688,841; Canadian Pat. No. 1,021,376 (Nov. 22, 1977); and Austrian Pat. No. 109,199 (Mar. 26, 1928).

Usually, these leading edges are shaped as a wind deflector and are permanently mounted to the truck, the trailer, or both; occasionally, a wind deflector is also mounted at the end of the trailer.

One basic problem with this arrangement is that heretofore, the wind deflectors have only been used as a permanent installation, and only in association with large and expensive trailers which are hauled by tractor trucks that are also expensive.

It would be preferred to avoid using an expensive tractor trailer arrangement, but instead use a removable aerodynamic wind deflector in association with an inexpensive vehicle, particularly a flatbed truck. This arrangement would represent a considerable reduction in the capital costs of a trailer and still retain benefits such as reduced gear and brake wear, lower horsepower requirements, and better fuel mileage. Also, this would represent a more efficient use of these wind deflectors.

It would also be preferable to load or unload a freight container directly from a ship onto or off a flatbed truck or other open carrier such as a flatbed railway freight car, and then quickly attach a wind deflector to the container or remove it quickly from the container. This would also reduce the need for unloading the freight container, reload the contents into a freight car and unloading again at the delivery point.

Preferably, the wind deflectors should be stackable, and since freight containers are usually the same size, only one size, or a limited few sizes of wind deflector would be required for commercial purposes.

Also, it would be desireable to position the container below the cab level to reduce the effect of a head wind or cross wind on the container, and hence the vehicle.

THE INVENTION

According to the invention, there is provided a removable wind deflector for attachment to a freight container and suitable for transportation on an open carrier such as an open or flatbed truck, railway freight car, and the like, and to a method of lowering wind resistance when transporting these containers. The wind deflector is attached to the front portion of the container, and a second wind deflector may also be attached to the rear of the container.

Usually, the container is removed from a storage area such as a ship, dockside, wharehouse, etc., and placed on a truck, after which the wind deflector is attached. Following transportation and unloading, the wind deflector is usually removed and stacked, and the empty container is stored. The truck or freight car is then, of course, available for other purposes aside from hauling containers or material which require containerization.

The capability of quickly attaching and releasing the wind deflector enables the container to be easily made available for shipping from the unloading area and/or storage, and for reuse after the container is unloaded.

BRIEF DESCRIPTION OF THE DRAWINGS

FIG. 1 is an external view in side elevation of shipping containers mounting a wind deflector and secured to a truck flatbed;

DESCRIPTION OF THE PREFERRED EMBODIMENTS

Figure 4:
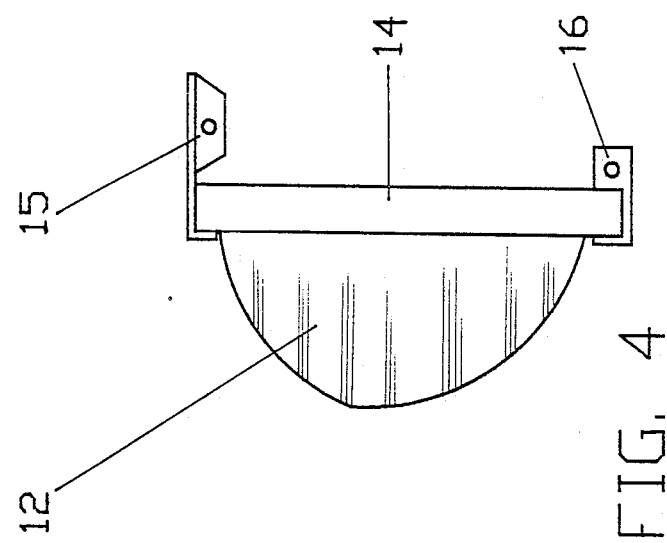
FIG. 4 is an enlarged view of the wind deflector and attachment frame shown in FIG. 1.
Figure 2:
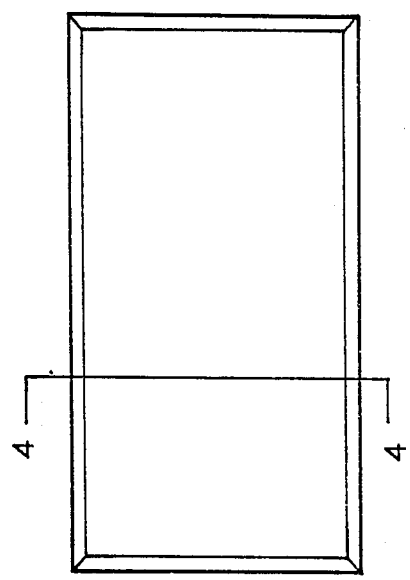
FIG. 2 is a front elevation view of an attachment frame for securing the wind deflector to the shipping container.
Figure 3:
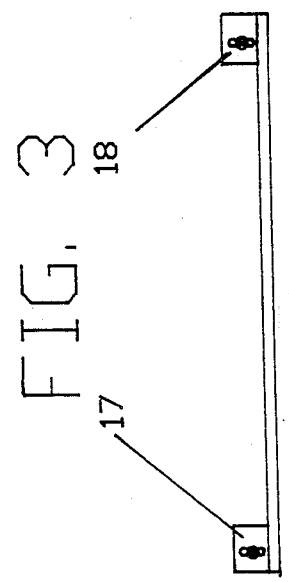
FIG. 3 is a plan view of the attachment frame of FIG. 2.

The assembly 10 of a freight container 11 having a wind deflector 12 mounted thereon and extending about half way over the forward end of the container is shown in FIG. 1. The assembly of the container and wind deflector is supported on a flatbed trailer 13.

The wind deflector may be manufactured of metal such as aluminum and sheet steel, or from molded plastic, fiberglass, etc. and is shaped to produce an aerodynamic function and also for easy stacking. The wind deflector may be riveted to a frame 14 which in turn is secured to the freight container by means of flange members, some members 15, 16, 17 and 18 being shown, and which are removably attached to the container by bolts or screws. The frame is sized to permit a close fitting onto the freight container. If desired, the wind deflector may be integrally molded with the frame, or bolted thereto.

Upon completion of a trip, the frame and wind deflector are removed from the container and disassembled. If the container is returned, the wind deflector may be left assembled to the container.

A second container 25 is shown in the flatbed trailer 13 mounting a wind deflector 26 on a frame 27, the wind deflector extending completely over the front end of the container. The container 25 is positioned ahead of the container 11 to provide better aerodynamic properties for the dual arrangement.

If desired, the cab of the flatbed truck may also have an aerodynamic wind deflector mounted thereon in the usual manner, and together with the positioning of the container below the level of the cab, will reduce drag on the truck.

Use of a freight container with a wind deflector reduces the capital cost associated with a container trailer, an open truck, flat bed truck, etc., and is also much lighter than container trailer. Fuel consumption, gear and brake wear are all reduced, as well as the need for greater engine horsepower. Also, assembly of the wind deflector with the freight container at the unloading point and disassembly at the place of delivery is quite simple, and does not require skilled workers. It will also be appreciated that the shape of the container, which is of course a rectangular oblong, does not have to be changed in order to accommodate attachment of the wind deflector, and that following disassembly from the container, the wind deflector and/or frame may be conveniently stacked.

I claim:

1. A lightweight assembly of a wind deflector for a freight container providing forward and trailing and edges, the deflector being of rigid form integrally formed with a deflector frame depending below a lower edge of said deflector, the frame being secured to the container solely by means of removable bolt means mounted on at least each of two lower corners of the frame, the frame thereby being adapted to be removably mounted on at least a portion of the forward end of the container, the freight container being adapted for loading and securement from a dock side onto an open vehicle, and then mounting of the frame and integrally formed deflector onto the container, or dismounting of the frame and integrally formed deflector from the container.

2. The assembly of claim 1, in which the wind deflector is shaped to conform with, and substantially covers the forward end of the container.

3. A method of reducing wind resistance on at least one freight container mounting a lightweight assembly of a wind deflector and an integrally formed mounting frame depending below a lower edge of said deflector, the wind deflector being of rigid form, the assembly being secured to the container solely by means of removable bolt means secured from each corner of the frame, the container defining forward and trailing end edges, and the frame being shaped to conform with the edges of the container, thereby providing a rigid aerodynamic structure, the frame being removably mounted on at least a portion of the forward end of the container; the method comprising: loading the container from a dock side onto an open vehicle, orienting the deflector towards the direction of travel of the vehicle to provide an aerodynamic surface for the container, and then mounting the frame and integrally formed rigid deflector onto the container by said bolt means, at a location below said lower edge of said rigid deflector; thereby reducing wind resistance on the vehicle and container.

4. The method of claim 3, in which two containers and mounted deflectors are secured on the open vehicle.

5. The lightweight assembly of claim 1, in which the frame is further secured to the freight container by removable bolt means mounted on upper corners of the frame.

6. A combination of a freight container with a lightweight assembly of a wind deflector and integrally formed frame, the freight container providing forward and trailing end edges, the deflector being of rigid form, and the frame depending below a lower edge of said deflector, the frame being secured to the container solely by means of removable bolt means mounted on at least each of two lower corners of the frame, and the frame thereby being adapted to be removably mounted on at least a portion of the forward end of the container, the freight container being adapted for loading and securement from a dock side onto an open vehicle, and then mounting of the frame and integrally formed deflector onto the container, or dismounting of the frame and integrally formed deflector from the container.

7. The combination of claim 6, in which the removable bolt means are further mounted on upper corners of the frame.

8. The combination of claim 6, in which the deflector is constructed of material including one of molded aluminum, plastic and fiberglass.

* * * * *